United States Patent Office 2,945,708
Patented July 19, 1960

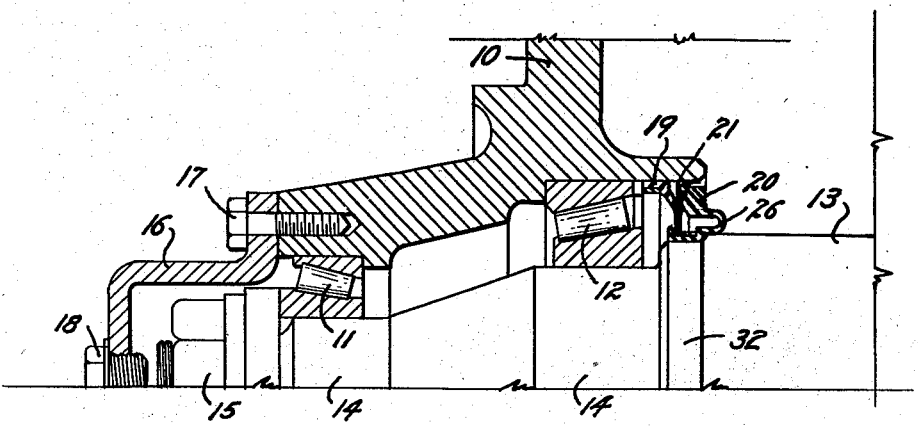
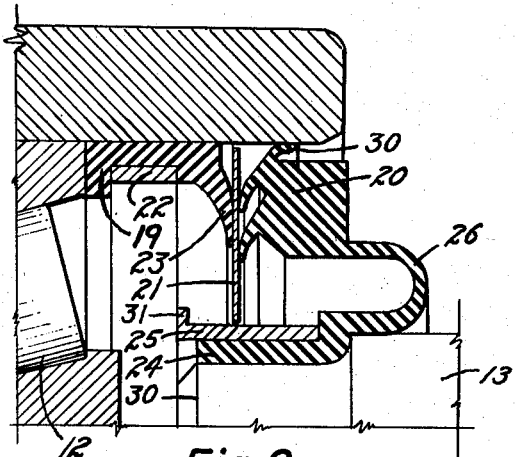
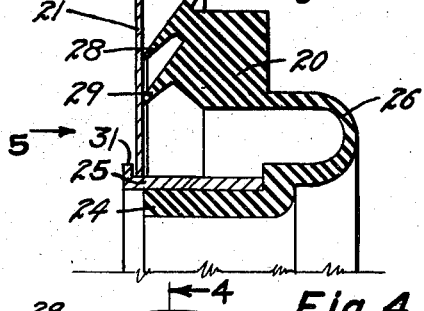
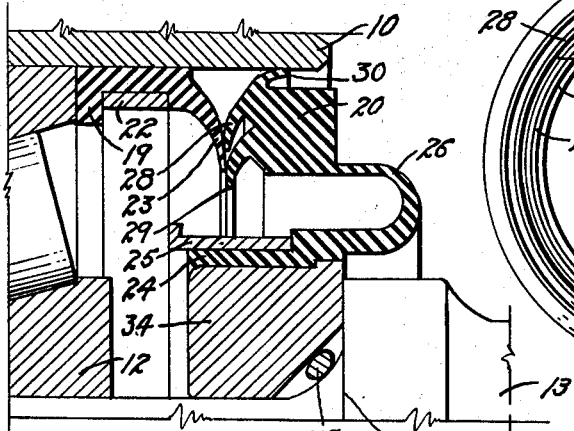
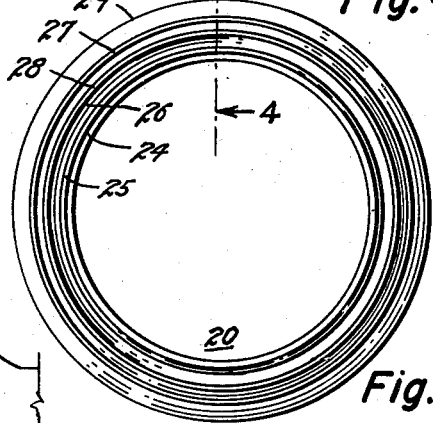

2,945,708
WHEEL HUB SEALING UNITS
Allen J. Stephens, 1144 Broadway, Denver, Colo.
Filed July 25, 1958, Ser. No. 751,056
4 Claims. (Cl. 286—5)

This invention relates to a hub sealing unit for sealing lubricating oil in the hub of a wheel, and is more particularly designed for sealing oil in the wheels of trailer vehicles. The principal object of the invention is to provide a sealing unit which can be quickly and easily installed on present axles and in conventional wheel hubs without requiring any changes in either the axle or the hub, and without requiring special tools of any kind, and which, when in place, will provide a positive seal against the escape of fluid lubricant from the wheels of heavily loaded, rapidly traveling, trailer vehicles of the types presently used for the transportation of freight.

Trailer wheels have in the past been lubricated with non-fluid lubricants of the types generally designated as axle greases. This type of lubrication has not been satisfactory on the heavily loaded, rapidly rotating wheels of modern freight transports. In sub-freezing weather, the greases assume a solid state which prevents proper functioning of the roller bearings of the wheels, and in exceedingly hot weather, the greases become so fluid they do not provide the proper bearing lubrication. With the use of this improved sealing unit, the wheel hubs can be partially filled with lubricating oil of the proper viscosity so that the bearings are continually bathed in lubrication, regardless of temperature variations and without danger of leakage.

A further object of the invention is to so construct the improved sealing unit that its sealing qualities will not be affected by longitudinal relative movement between the wheel and the axle or by a misaligned wobbling movement of the wheel.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a substantially full size, longitudinal, axial section, showing the upper half of a conventional wheel hub and the upper half of a conventional axle with the improved sealing unit in place therebetween;

Fig. 2 is an enlargement of the portion of Fig. 1 containing the improved sealing unit showing the latter in the installed, running position;

Fig. 3 is a similarly enlarged, fragmentary, detail section through an outer sealing ring employed in the sealing unit as it would appear before installation in the hub;

Fig. 4 is a similar detail cross-section through an inner sealing ring employed in the sealing unit as it would appear before installation;

Fig. 5 is a substantially full size, face view of an uninstalled inner sealing ring looking in the direction of the arrow 5, Fig. 4; and Fig. 6 is an enlarged, fragmentary, detail section showing an alternate arrangement of the improved sealing unit on a different type of conventional axle.

In the drawing, elements of a conventional wheel and axle combination are indicated by numerals as follows: wheel hub 10, outer roller bearing 11, inner roller bearing 12, and wheel axle 13 with the usual gasket land 32. The bearings 11 and 12 are mounted on the usual bearing lands 14 and with the usual axle nut is illustrated at 15 holding the bearings and the hub in place upon the axle.

For the uses of this invention, the hub 10 is closed over the axle nut 15 by means of a fluid-tight hub cap 16 secured thereto in any desired manner, such as by means of suitable cap screws 17 and provided with an oil filling plug 18. In use, the hub 10 is partially filled with lubricating oil, and this invention is designed to prevent the escape of the oil from the hub 10 around the axle 13.

The improved sealing unit comprises three elements, to wit, a flexible inner sealing ring 19, a flexible outer sealing ring 20, and an intermediate annular metallic disc 21. The sealing rings 19 and 20 are molded from any suitable resilient material such as tread stock rubber, and the sealing disc 21 is stamped from exceedingly thin gauge sheet metal, such as spring bronze, stainless steel or the like (between #20 and #30 B. & S. gauge or .005 carbon steel shim stock).

The inner sealing ring 19 is molded with a normal external diameter slightly in excess of the inside diameter of the hub 10, and is provided with a metallic, rigid, stiffening band 22 embedded therein so that, when forced into the hub 10, the material of which the ring is molded will be compressed between the inner surface of the hub and the outer surface of the stiffening band 22 so as to provide a fluid-tight seal between the ring 19 and the hub 10. A relatively thin, flexible, tapered sealing skirt 23 extends from one edge of the ring 19 throughout its periphery at an angle of substantially 45° with the axis of the ring, as shown in Fig. 3.

The outer sealing ring 20 is shown in cross-section in Fig. 4 as it would appear before installation. This ring has a cylindrical sleeve portion 24 with an internal diameter slightly less than the diameter of the axle 13, and provided with a metal restraining band 25 provided with an edge flange 31. The sleeve portion 24 is designated to be forced over the axle 13, as shown in Fig. 1, so that the material from which the ring is formed will be compressed between the restraining band 25 and the axle 13 to provide a perfectly tight fluid seal therebetween.

The outer ring 20 is formed with an annular roll 26 which flexibly connects it with the sleeve portion 24. Radial expansion of the outer sealing ring 20 is resisted by its relatively heavy cross section.

It can be seen that the outer ring 20 can be forced to the right as shown in Fig. 2, the ring material simply rolling around the roll 26, and if released, the inherent resiliency of the roll 26 will return the ring 20 to the normal position of Fig. 4. The side of the ring 20 which is directed toward the inner ring 19 is provided with an outer annular lip 28 of relatively large diameter and with an inner flexible annular lip 29 of relatively smaller diameter. The lips are flexible and tapered in cross-section and normally inclined axially inward at approximately 45° in spaced-apart relation, as shown in Fig. 4. The ring 20 is also provided with a flexible peripheral skirt 30 which extends oppositely outward from the lip 28.

The installation of the improved sealing ring is exceedingly simple. It is only necessary to remove the wheel hub 10 and force the inner sealing ring 19 into the hub and against the bearing 12, and to force the outer sealing ring 20 over the gasket land 32 of the axle in the position shown in Fig. 1. The flexible annular sealing disc 21 is inserted in the outer ring 20 behind the edge flange 31 as shown in Fig. 4. The wheel hub 10 is then replaced upon the axle and forced into position on the bearings 11 and 12, and as it moves longitudinally inward, the disc 21 will be brought to a position in a plane at right angles to the axis of the axle, as shown in Fig. 2.

It is not intended that the disc 21 rotate, as it is believed in most cases the skirt 23 will retain it stationary. However, it is immaterial to the sealing effect whether the disc 21 rotates or remains stationary. Oil tending to travel radially outwardly on the inside face of the disc 21 will be wiped from the disc by the skirt 23 and returned to the interior of the hub. Oil attempting to travel outwardly on the outer face of the disc, due to centrifugal action, will be wiped from the disc by the two lips 28 and 29. The lip 29 acts to prevent the entrance of water and dust from the exterior into the hub bearings. Longitudinal movement of the hub or wheel-wobble is accommodated by the roll 26 which allows the entire outer ring 20 to move axially to follow movements of the disc 21. The flexibility of the disc also allows it to accommodate itself to irregular or wobbling movements and still maintain the oil seal. The skirt 23 and the lips 28 and 29 are constantly and resiliently flexed due to the inherent resiliency and resistance of the roll 26.

In Figs. 1 and 2, the invention is illustrated applied to a type of conventional axle of the type in which the inner bearing 12 is positioned against the gasket land 32. On certain types of axle the land 32 is eliminated and a shoulder 33 is provided which is set back, as shown in Fig. 6, from the bearing 12, and a spacing ring 34 is placed between the bearing 12 and the set back shoulder 33 and against a suitable sealing O-ring 35 to provide a gasket land. The sleeve portion 24 of the outer sealing ring 20 is designated to fit snugly over the spacing ring 34 on the latter type of axle. Otherwise, the construction of the inner and outer rings 19 and 20 is similar to that previously described.

In Fig. 3, the two rings are shown operating without a flexible disc therebetween, in which case the lips 28 and 29 of the outer sealing ring 20 frictionally engage the skirt 23 on the inner sealing ring 19 to provide an oil seal therebetween. It is to be understood that the flexible disc 21 can be eliminated from the structure of Fig. 2, and that a similar disc can be inserted in the structure of Fig. 3 as desired.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A lubrication sealing unit for resisting the escape of fluid lubricant between a wheel hub and an axle comprising: an inner sealing ring adapted to be inserted into, and into sealing engagement with said hub; an outer sealing ring; a cylindrical sleeve in said outer sealing ring adapted to be fitted over, and into sealing engagement with, said axle; a roll of resilient material joining said sleeve to said outer ring and acting to urge said outer ring axially toward said inner sealing ring; a single annular skirt formed on the outer face of the outer sealing ring and extending toward said outer sealing ring; and two annular skirts formed on the inner surface of said outer ring and extending toward said inner sealing ring, all of said skirts flexing axially inward as said rings approach each other to prevent the escape of fluid between said sealing rings.

2. A lubrication sealing unit as described in claim 1 having an annular disc the outer diameter of said disc being less than the outer diameter of said inner ring and having an open center of a diameter greater than the outer diameter of the cylindrical sleeve of said outer ring; said disc being positioned between said inner and outer rings in a plane substantially at right angles to the axis of said axle, the skirts of the inner and outer rings being flexed against the inner and outer faces, respectively, of said disc.

3. A lubrication sealing unit as described in claim 2 in which the cylindrical sleeve of the inner ring extends through the open center of said disc.

4. A lubrication sealing unit as described in claim 3 having a holding ridge formed on and surrounding said sleeve to retain said disc thereon.

References Cited in the file of this patent

UNITED STATES PATENTS

| | | |
|---|---|---|
| 2,167,669 | Molyneux | Aug. 1, 1939 |
| 2,657,104 | Kayser | Oct. 27, 1953 |
| 2,705,164 | Dasse | Mar. 29, 1955 |